(12) United States Patent
Sallas et al.

(10) Patent No.: US 11,960,903 B2
(45) Date of Patent: Apr. 16, 2024

(54) ADAPTIVE SETTINGS FOR A DEVICE

(71) Applicant: Comcast Cable Communications, LLC, Philadelphia, PA (US)

(72) Inventors: Michael Sallas, Radnor, PA (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/299,790

(22) Filed: Jun. 9, 2014

(65) Prior Publication Data

US 2015/0355909 A1 Dec. 10, 2015

(51) Int. Cl.
*G06F 9/44* (2018.01)
*G06F 9/4401* (2018.01)

(52) U.S. Cl.
CPC .................. *G06F 9/4411* (2013.01)

(58) Field of Classification Search
CPC .......................................... G06F 9/44
USPC .......................................... 713/100
See application file for complete search history.

(56) References Cited

U.S. PATENT DOCUMENTS

| | | | | |
|---|---|---|---|---|
| 6,182,231 B1* | 1/2001 | Gilgen | ................. | G06F 1/3203 710/59 |
| 7,383,457 B1* | 6/2008 | Knight | ..................... | G06F 1/32 713/320 |
| 8,326,346 B2* | 12/2012 | Young | .................... | G08C 17/02 455/550.1 |
| 8,432,264 B1* | 4/2013 | Hsu | ......................... | G05B 11/01 340/12.22 |
| 8,543,227 B1* | 9/2013 | Perek | .................... | G06F 1/1618 463/39 |
| 8,601,301 B1* | 12/2013 | Arscott | ................. | G06F 1/3203 713/320 |
| 2006/0081771 A1* | 4/2006 | Eliad Wardimon | ....... | G01J 1/32 250/221 |
| 2006/0197735 A1* | 9/2006 | Vuong | ................. | G09G 3/3406 345/102 |
| 2007/0050654 A1* | 3/2007 | Switzer | ................. | G06F 1/3265 713/320 |
| 2008/0008313 A1* | 1/2008 | Fyke | ................. | H04W 52/0254 379/433.01 |
| 2008/0167834 A1* | 7/2008 | Herz | ..................... | G06F 1/3203 702/150 |
| 2011/0080349 A1* | 4/2011 | Holbein | ................ | G06F 1/3203 345/212 |
| 2011/0223974 A1* | 9/2011 | Agevik | ................. | G06F 1/1626 455/566 |
| 2011/0230228 A1* | 9/2011 | Young | .............. | H04N 21/42222 455/550.1 |

(Continued)

*Primary Examiner* — Jaweed A Abbaszadeh
*Assistant Examiner* — Cheri L Harrington
(74) *Attorney, Agent, or Firm* — Ballard Spahr LLP

(57) ABSTRACT

Provided are methods and systems for adaptive settings for a device. An example method can comprise utilizing a first configuration setting for a feature in a device, detecting a change in a device factor, and utilizing a second configuration setting for the feature in the device in response to the detected change. Another example method can comprise detecting a change in a device factor, activating a device feature, determining whether a change threshold has been exceeded, and updating a configuration setting for a device feature if the change threshold has been exceeded.

26 Claims, 5 Drawing Sheets

(56) References Cited

U.S. PATENT DOCUMENTS

| | | | | |
|---|---|---|---|---|
| 2011/0307891 A1* | 12/2011 | Orr | ............... | G06F 1/3215 |
| | | | | 718/100 |
| 2012/0153868 A1* | 6/2012 | Gu | ............... | H05B 47/115 |
| | | | | 315/307 |
| 2014/0020445 A1* | 1/2014 | Waters | ............... | G06F 1/32 |
| | | | | 73/1.01 |
| 2014/0101472 A1* | 4/2014 | Rohrweck | ............ | G06F 1/3206 |
| | | | | 713/323 |
| 2014/0123156 A1* | 5/2014 | Schillings | ............ | G06F 1/3265 |
| | | | | 719/318 |

\* cited by examiner

ADAPTIVE SETTINGS FOR A DEVICE

BACKGROUND

Many devices have preprogrammed configuration settings that impact device operation. The settings may be preprogrammed parameters associated with device features. Such preprogrammed features, however, take no account of the changes in the operational environment of a device, and sometimes can make a device less efficient and less convenient to use as the device operational environment changes. Therefore, it is desirable to have methods and systems for a device to utilize adaptive configuration settings according to the changes in operational environment of the device.

SUMMARY

It is to be understood that both the following summary and the following detailed description are exemplary and explanatory only and are not restrictive, as claimed. Provided are methods and systems for adaptive settings for a device. An example method can comprise utilizing a first configuration setting for a feature in a device, detecting a change in a device factor, and utilizing a second configuration setting for the feature in the device in response to the detected change. Another example method can comprise detecting a change in a device factor, activating a device feature, determining whether a change threshold has been exceeded, and updating a configuration setting for a device feature if the change threshold has been exceeded.

As an example, the feature in a device can be, or implemented using, one or more of an audio sensor, a vibration sensor, a light sensor, a motion sensor, a position sensor, a proximity sensor, a display, a speaker, a communication module, a power supply, an operational function, a ringer, a backlight, a user interface, a timer, a camera, an electronic compass, a barometer, a finger print reader, and the like. In an aspect, the configuration setting can comprise a parameter associated with the feature. For example, the parameter can relate to one or more of a timer value, a sensitivity, a power level, a brightness, a power state, and the like. In another aspect, the device factor can relate to one or more of a spatial position, light exposure, vibration, sound, and sound pattern, and the like.

In an aspect, the parameter associated with the device feature can be set to a specific value. For example, a timer associated with a device feature can be set to a specific value. The sensitivity of an audio sensor, a vibration sensor, a light sensor, a motion sensor, a position sensor can be set to a specific value. The power level of a device can be set to a specific value. The brightness of a device can be set to a specific value. Accordingly, updating a configuration setting for the device feature can comprise one or more of incrementing a value, decrementing a value, and changing the state of a value of a parameter associated with a device feature, such as a timer value, a sensitivity, a power level, a brightness, a power state, and the like.

In another aspect, an example apparatus can comprise a memory and a processor. The memory can be configured for storing configuration settings (e.g., a first configuration setting, a second configuration setting) for a device feature. The processor can be configured for performing steps comprising utilizing the first configuration setting for a feature in a device, detecting a change in a device factor, and utilizing the second configuration setting for the feature in the device in response to the detected change.

In yet another aspect, an example apparatus can comprise a memory and a processor. The memory can be configured for storing a configuration setting. The processor can be configured for performing steps comprising detecting a change in a device factor, activating a device feature, determining whether a change threshold has been exceeded, and updating a configuration setting for a device feature if the change threshold has been exceeded.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
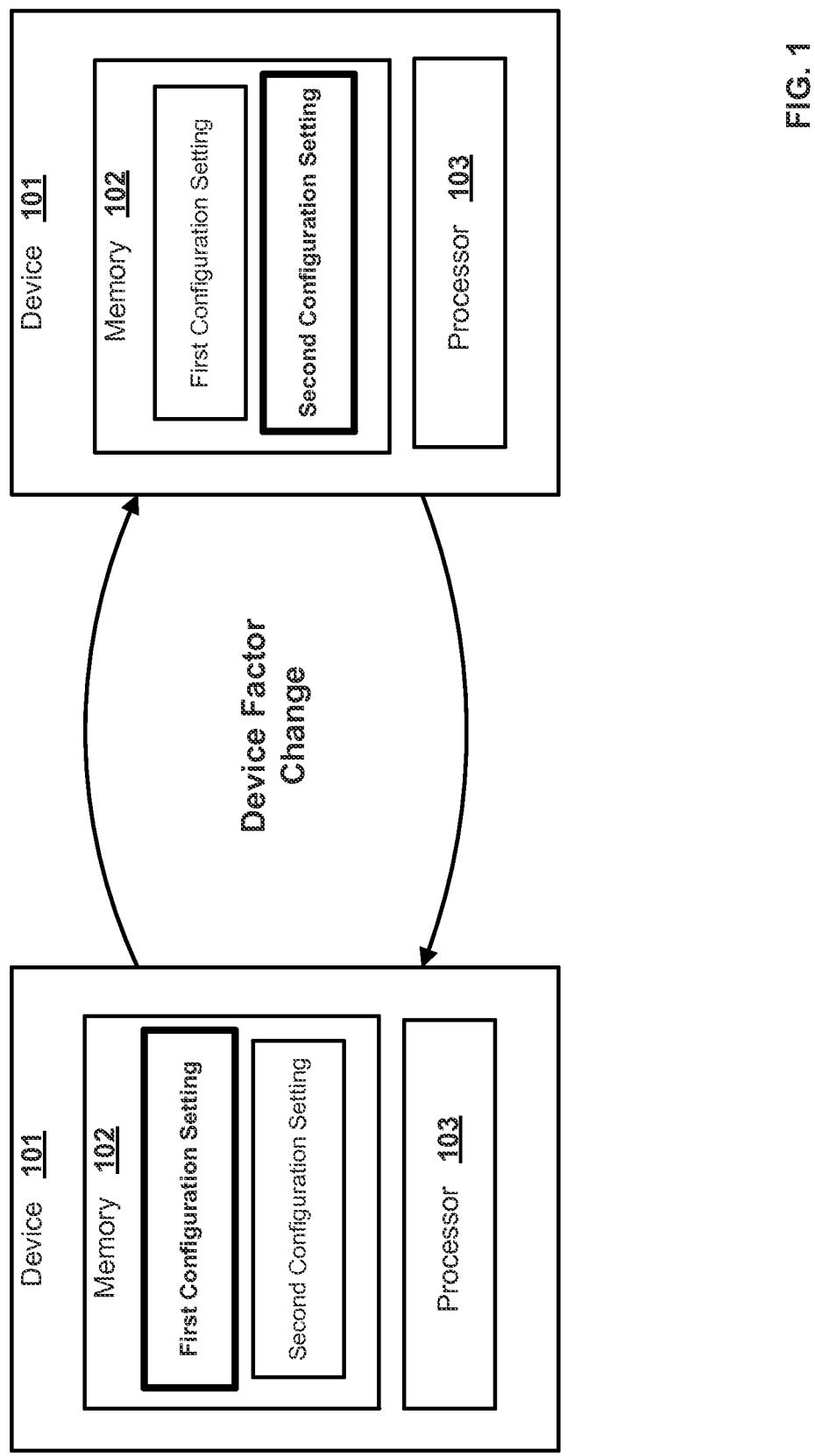
FIG. 1 is a block diagram illustrating an example system environment for utilizing adaptive settings for a device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups. etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for utilizing adaptive settings for a device are disclosed. Specifically, a device can utilize adaptive configuration settings according to the changes in the operational environment of the device. An example method can comprise utilizing a first configuration setting for a feature in a device, detecting a change in a device factor, and utilizing a second configuration setting for the feature in the device in response to the detected change. Another example method can comprise detecting a change in a device factor, activating a device feature, determining whether a change threshold has been exceeded, and updating a configuration setting for a device feature if the change threshold has been exceeded.

An example apparatus can comprise a memory and a processor. The memory can be configured to store configuration settings (e.g., a first configuration setting, a second configuration setting) for a device feature. In an aspect, the processor can be configured to utilize the first configuration setting for a feature in a device, detect a change in a device factor, and utilize the second configuration setting for the feature in the device in response to the detected change. In another aspect, the processor can be configured to detect a change in a device factor, to activate a device feature, to determine whether a change threshold has been exceeded, and to update a configuration setting for a device feature if the change threshold has been exceeded.

FIG. 1 is a block diagram illustrating an example system environment for utilizing adaptive settings for a device. In an aspect, device 101 can comprise memory 102 and processor 103. By way of example, the device 101 can be a remote control, a tablet, a phone, a smart phone, a laptop, a mobile device, a display device, PDA, GPS, vehicle entertainment system, portable media player, and the like. The memory 102 can be configured to store configuration settings (e.g., a first configuration setting, a second configuration setting) for a device feature. The processor 103 can be configured to utilize the first configuration setting for a feature in device 101, to detect a change in a device factor, and to utilize the second configuration setting for the feature in device 101 in response to the detected change. In another aspect, the memory 102 can be configured to store a configuration setting for a device feature. The processor 103 can be configured to detect a change in a device factor, to activate a device feature, to determine whether a change threshold has been exceeded, and to update a configuration setting for the device feature if the change threshold has been exceeded.

As an example, the device 101 can be a backlit remote control. The backlit remote control can be a set top box remote control, a TV remote control, a DVD/VCR remote control, an audio remote control, a satellite dish remote control, a universal remote control, and the like. In an aspect, the device feature of the device 101 can comprise a backlight, an audio sensor, a light sensor, a motion sensor, a position sensor, a proximity sensor, a display, a speaker, a power supply, a communication module, an operational function, a ringer, a backlight, a user interface, a camera, an electronic compass, a barometer, a finger print reader, a timer associated with the backlight, a timer associated with the audio sensor, a timer associated with the light sensor, a timer associated with the motion sensor, a timer associated with the position sensor, a timer associated with the proximity sensor, a timer associated with the display, a timer associated with the speaker, a timer associated with the power supply, a timer associated with the camera, a timer associated with the user interface, a timer associated with the electronic compass, a timer associated with the barometer, a timer associated with the finger print reader, and the like. For example, when the backlit remote control is in use, the backlight can be turned on. When the backlit remote control is not in use, the backlight can be turned off. In an aspect, a timer associated with the backlight can be set to keep the backlight on for a specific duration. As another example, when the backlit remote control is being used, the sensitivity of a motion sensor and/or position sensor can be set to a high level. When the backlit remote control is not being used, the sensitivity of a motion sensor and/or position sensor can be set to a low level. As another example, when the backlit remote control is being used in a dark or a bright environment, the brightness of the display or backlight can be adjusted to be brighter or darker for ease of viewing. For example, when the environment is bright enough, the backlight can be turned off.

In an aspect, a device feature of a device can be associated with display, audio, movement, communication, operational function characteristics of the device, and the like. For example, the device features can be one or more of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like.

In an aspect, a configuration setting can be a parameter associated with a device feature. For example, the parameter can relate to one or more of a timer value, a sensitivity, a power level, a brightness, and a power state, and the like. In an aspect, the parameter associated with the device feature can be set to a specific value. For example, the configuration setting can be a predefined value of sensitivity of an audio sensor, a vibration sensor, a light sensor, a motion sensor, a position sensor, and the like. As another example, the configuration setting can be a predefined value of a speaker level, a power supply level, a ringer level, and the like. As another example, the configuration setting can be a predefined brightness of a display or backlight. As another example, the configuration setting can be a predefined time for a timer. As another example, the configuration setting can be a power state (e.g., on, off) of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like.

In an aspect, a device factor can relate to one or more of: spatial position, light exposure, vibration, sound, sound pattern, activation state (e.g., activated, deactivated) of one or more buttons, and the like. Accordingly, a device factor change can be a change of spatial position, a change of light exposure, a vibration, a sound or sound pattern, one or more buttons being activated, one or more buttons being deactivated, and the like. In an aspect, the device factor change can be effected by a user. For example, a user can pick up or put down device 101 to change the spatial position of the device. As another example, a user can press an "on" or "off" button to turn on or turn off the device 101. As another example, a user can move device 101 from a dark environment to a bright environment or vice versa. As another example, a user can move device 101 from a noisy environment to a quiet environment or vice versa.

As an example, the spatial position change of device 101 can be detected by a motion and/or position sensor, such as an accelerometer and/or global positioning system (GPS) implemented in the device. As another example, the light exposure change of device 101 can be detected by a light sensor, such as an ambient light sensor implemented in the device. As another example, the sound level and/or sound pattern change in the operational environment of device 101 can be detected by a sound sensor implemented in the device 101. As another example, the activation or deactivation of the one or more buttons of device 101 can be detected when a user activates or deactivates one or more buttons on the device 101. In an aspect, activation or deactivation of one or more buttons can comprise activation or deactivation a specific sequence of buttons.

In an aspect, detecting a change in a device factor can comprise determining whether a threshold has been exceeded; for example, whether the spatial position change has exceeded a predefined threshold, whether the change of light exposure has exceeded a predefined threshold, or whether the change of sound and/or sound pattern has exceeded a predefined threshold. For example, when device 101 is picked up from a stationary state and the spatial position change has exceeded a predefined threshold, a change in a device factor can be detected. As another example, when device 101 is moved from a bright environment to a dark environment and the light exposure change has exceeded a predefined threshold, a change in device factor can be detected. As another example, when the spatial position of device 101 changes from random movement to no movement or a predefined pattern of movement (e.g., when a curved device 101 is put down on a table, it can wobble on the table), and the device 101 remains stationary for a predefined time, both the spatial change and the time associated with the spatial change have exceeded a predefined value, a device factor change can be detected.

In an aspect, the first configuration setting and the second configuration setting can be stored in memory 102, and can be different. The second configuration setting can comprise one or more different settings from the first configuration setting, such as a higher sensitivity level for the motion sensor, a different power state for one or more device features, a shorter or longer timer associated with one or more device features, and the like. In an aspect, the second configuration setting can comprise one or more of: incrementing a value, decrementing a value, and changing the state of a value of a parameter associated with a device feature. For example, the second configuration setting can comprise incrementing or decrementing the value of sensitivity of an audio sensor, a vibration sensor, a light sensor, a motion sensor, or a position sensor. As another example, the second configuration setting can comprise incrementing or decrementing the value of a speaker level, a power supply level, or a ringer level. As another example, the second configuration setting can comprise incrementing or decrementing a brightness of a display. As another example, the second configuration setting can comprise incrementing or decrementing time for a timer. As another example, the second configuration setting can comprise changing the power state (e.g., on, off) of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like.

In an aspect, the configuration settings of device 101 can be associated with user profiles. For example, user profiles can comprise preferred configuration settings for one or more of a plurality of users. Specifically, different users can have their own preferred configuration settings for the device 101. For example, for the same operational environment, different users may prefer different sensitivity levels for a motion sensor in a device. In an aspect, the user profile can be associated with a time of day. For example, a night-time profile or a day-time profile can be used, depending on when a device will be operated. Specifically, the day-time user profile can be used for day-time operation and the night-time user profile can be used for night-time operation. For example, a backlight timer of the device 101 can be set to a longer period of time in the night-time profile than the day-time profile.

In an aspect, the configuration settings and/or user profiles of the device 101 can be stored in one or more remote storage devices or systems. As such, the configuration settings and/or user profiles of device 101 can be updated on or retrieved from the device 101 directly or remotely. In the latter case, the configuration settings and/or user profiles can be updated or retrieved via one or more remote devices (not shown) connected to the device 101. In an aspect, the configuration settings and/or user profiles for device 101 can be updated or retrieved by entering a device identifier of the device 101 via one or more remote devices. The device identifier of the device 101 can be associated with a list of device features and base parameters associated with the device features of the device 101. In another aspect, the user profile can be updated and/or retrieved by entering a user identifier via device 101 or one or more remote devices. The user identifier can be associated with preferred configuration settings for a specific user of the device 101.

As an example, the device 101 can be a backlit remote control implemented with a motion sensor (e.g., accelerometer, GPS device, etc.). When the backlit remote control device 101 remains stationary (no spatial change) for a predefined time (e.g., 60 seconds), the device can be configured to utilize a first configuration setting. In one specific implementation, the first configuration setting can comprise a low sensitivity level for the motion sensor (e.g., accelerometer, GPS device) and a timer for automatically turning off the device backlight after a predefined time. In this case, the device factor is the spatial position of device 101, and the device features are motion sensor and power supply for the device backlight. The parameters associated with the device features are sensitivity of motion sensor (e.g., low sensitivity) and a timer associated with the power supply of the device backlight (e.g., off).

In an aspect, the change in a device factor can be detected. For example, a button activation can be detected when a user presses a button (e.g., the "on" button) on device 101. As another example, a spatial change can be detected when a user picks up the device 101. In an aspect, a predefined sequence of change in device factors can trigger the device 101 to use a different configuration setting. For example, a first device factor can be detected when a user presses the "on" button, and then a second device factor can be detected when a spatial change of the device 101 is detected. The change of a device factor or a predefined sequence of device factors can trigger the device to utilize a second configuration setting. Specifically, the second configuration setting can comprise a different configuration setting from the first configuration setting. The second configuration setting can comprise one or more different settings from the first configuration setting, such as a higher sensitivity level for the motion sensor, a different power state for one or more device features (e.g., keep device backlight on), a shorter or longer timer associated with one or more device features, and the like. The sensitivity of the motion sensor can be set at a high level in the second configuration setting because once a user picks up the device, it can be interpreted as the device is being used, and high level of sensitivity of the motion sensor can be used for close monitoring of the random spatial position change and/or minor spatial position change of the device, and thus for determining whether the user is holding the device and intends to use the device.

In another aspect, when the device is utilizing the second configuration setting, a device factor change can be detected. For example, the spatial position of device 101 changes from random movement to no movement or a predefined pattern of movement (e.g., a curved remote that wobbles on the table), and then the device 101 remains stationary (e.g., no spatial change) for a predefined duration of time (e.g., 60 seconds). The device factor change can be interpreted as the device has been put down and is not being used. The device factor change can trigger the device to utilize the first configuration setting (e.g., low sensitivity for a motion sensor, turn off the device backlight after 5 seconds). As another example, when the user presses an "power" button on the device, a device factor change can be detected, the device can be configured to utilize the first configuration setting (e.g., low sensitivity for a motion sensor, turn off the device backlight after 5 seconds). As another example, when a user presses a number of buttons in a specific sequence (e.g., "play" and "pause") and no further action is detected for a predefined time (e.g., 60 seconds), a device factor change can be detected. The device factor change can be interpreted as that the user is not actively engaged in using the device. As another example, the device factor change can be interpreted as that the user is about to stop using the device. The device factor change can trigger the device to utilize the first configuration setting (e.g., low sensitivity for a motion sensor, turn off the device backlight after 5 seconds).

In an aspect, the processor 103 can detect a change in a device factor, activate a device feature, determine whether a change threshold has been exceeded, and update a configuration setting for a device feature if the change threshold has been exceeded. As an example, when a change in a device factor is detected (e.g., a device is moved from a bright environment to a dark environment or from a dark environment to a bright environment), a configuration setting for a device feature can be updated (e.g., set the backlight display on device 101 to low brightness or high brightness). In an aspect, the configuration setting can be updated when a change threshold is detected (e.g., threshold of brightness change when the device is moved from a bright environment to a dark environment or from a dark environment to a bright environment), the configuration setting for the device feature (e.g., the brightness of the backlight or display) can be updated (e.g., increased or decreased) for ease of viewing. For example, when the environment is bright enough, the backlight can be turned off.

As another example, when device 101 is utilizing the second configuration setting (e.g., high sensitivity for a motion sensor, keep the device backlight on), if no spatial change is detected for a predefined duration of time (e.g., 60 seconds), a device feature is activated, and the device 101 can utilize the first configuration setting (e.g., set the sensitivity of the motion sensor to low level, turn off the device backlight after 5 seconds).

In an aspect, it may be the case that a user is holding the device and intends to use it, but the sensitivity of a motion sensor is not adequate for detecting the movement of the device. As such, in response to the device backlight being turned off, the user can shake the device (e.g., high frequency spatial position change) soon after the device backlight is turned off and a second configuration setting can be utilized. For example, the motion sensor can be set to a high sensitivity to keep the device backlight on in the second configuration setting. In the meantime, a change threshold can be exceeded. Specifically, if the elapsed time between the turning off of the backlight and a high frequency spatial position change of the device is below a predefined value (e.g., 2 seconds), a configuration setting for a device feature can be further updated. Specifically, a device feature in the first configuration setting (e.g. backlight timer) can be updated to temporarily add X seconds (e.g., 1, 2 second) to the original backlight timer setting (e.g., 5 seconds) or previous backlight timer setting. In addition to the backlight timer setting being updated, a device feature in the second configuration setting (e.g., the sensitivity of the motion or position sensor) in the device 101 can be updated (e.g., increased) to a higher level than the sensitivity in the original second configuration setting.

In an aspect, determining whether a change threshold has been exceeded can comprise determining whether the frequency of a change threshold has been exceeded. As an example, if the user of the device 101 performs a shake (e.g., high frequency spatial position change) to turn on the device backlight immediately after the device backlight has turned off, the change threshold has been exceeded. As another example, if the time between the a high frequency spatial position change of the device 101 and a subsequent high frequency spatial position change of the device 101 is below a predefined value (e.g., 30 seconds), the change threshold has been exceeded and the frequency of the change threshold has been exceeded. In response to the change threshold being exceeded, a device feature in the first configuration setting (e.g., backlight timer) can be permanently incremented by X seconds (e.g., 1 second, 2 seconds).

Similarly, when the device is utilizing the second configuration setting (e.g., high sensitivity for a motion sensor, and keep the device backlight on), if no spatial change is detected for a predefined duration of time (e.g., 60 seconds), the first configuration settings can be used (e.g., set the sensitivity of the motion sensor to low level, turn off the device backlight after 5 seconds). If a user has never needed to shake the device after the device backlight has turned off for a predefined number of uses (e.g., 30 times), a change threshold can be detected. In response to the change threshold being exceeded, a device feature in the first configuration setting (e.g. backlight timer) can be updated to temporarily decrement X seconds (e.g., 1 second, 2 seconds) from the original timer setting (e.g., 5 seconds). If a user still does not shake the device after the device backlight has turned off for a predefined number of uses (e.g., 60 times), a change threshold can be detected. In response to the change threshold being exceeded, a device feature in the first configuration setting (e.g. backlight timer) can be updated to permanently decrement X seconds (e.g., 1 second, 2 seconds) from the original timer setting (e.g., 5 seconds). In an aspect, if a user shakes the device after a device feature (e.g., backlight timer) setting has been updated from the original setting, the device feature (e.g., backlight timer) setting can be further updated to use the parameter associated with the device feature in the original configuration setting.

In an aspect, the device 101 can be configured to have as many configuration settings as needed. As an example, the device 101 can have three configuration settings: specifically, a first configuration setting, a second configuration setting, and a third configuration setting. The three configuration settings can be stored in the memory 102. The processor 103 can be configured to utilize a first configuration setting for a feature in device 101, to detect a change in a device factor, to utilize a second configuration setting for the feature in the device in response to the detected change, to detect another change in a device factor, and to utilize a third configuration setting for the feature in the device in response to the detected change. In another aspect, a device 101 can comprise a default configuration setting and a modified configuration setting. The modified configuration setting is subject to modification as the device 101 is used, whereas the default configuration setting remains the same.

In an aspect, the second configuration setting can be different from the first configuration setting. The second configuration setting can comprise one or more of: incrementing a value, decrementing a value, and changing the state of a parameter associated with a feature based on the first configuration setting. Similarly, the third configuration can be different from the first and the second configuration setting. The third configuration setting can comprise one or more of: incrementing a value, decrementing a value, and changing the state of a value of a parameter associated with a feature based on the first and/or second configuration setting.

In an aspect, it is not required for a device to utilize configuration settings in a specific sequence. A device factor change can trigger a device to utilize any available configuration setting for a device feature. As an example, a device factor change can trigger the device to utilize a third configuration setting from utilizing a first configuration setting or vice versa. In an aspect, different configuration settings can be triggered by different device factor changes. For example, a light sensor can trigger the device to utilize the first configuration setting. A motion sensor can trigger the device to utilize the second configuration setting.

As an example, when the device 101 is utilizing the second configuration setting (e.g., high sensitivity for a motion sensor, and keep the device backlight on), if no spatial change is detected for a predefined duration of time (e.g., 60 seconds), a device feature can be activated (e.g., set the sensitivity for the motion sensor to low level, turn off the device backlight after 5 seconds). In an aspect, it may be the case that a user is holding the device and intends to use it, but the sensitivity of a motion sensor in the second configuration setting is not adequate for detecting the movement of the device. As such, in response to the device backlight being turned off, the user can shake the device (e.g., high frequency spatial position change) soon after the device backlight is turned off and the device factor change can trigger the device to utilize a third configuration setting (not shown). For example, the third configuration setting can comprise a higher sensitivity for the motion sensor than the sensitivity for the motion sensor in the second configuration setting, and keeping the device backlight on.

Figure 2:
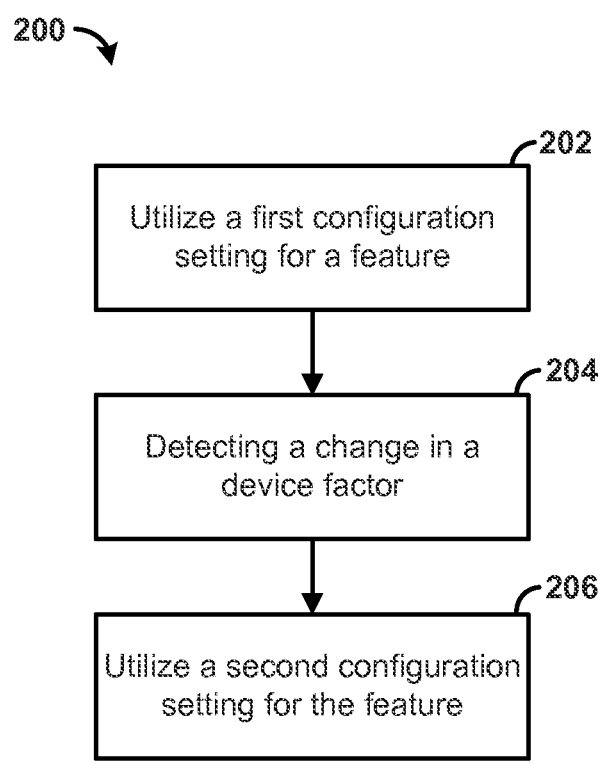
FIG. 2 is a flowchart illustrating an example method for utilizing adaptive settings for a device.

FIG. 2 is a flowchart illustrating an example method 200 for utilizing adaptive settings for a device. At step 202, first configuration setting for a feature in a device can be utilized. As an example, the feature in a device can be, or be implemented using one or more of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like. In an aspect, the configuration setting can be a parameter associated with the feature. For example, the parameter can relate to one or more of a timer value, a sensitivity, a power level, a brightness, a power state, and the like. In an aspect, the parameter associated with the device feature can be set to a specific value. As an example, the configuration setting can be a predefined value of sensitivity of an audio sensor, a vibration sensor, a light sensor, a motion sensor, a position sensor. As another example, the configuration setting can be a predefined value of a speaker level, a power supply level, a ringer level. As another example, the configuration setting can be a predefined brightness of a display or backlight. As another example, the configuration setting can be a predefined time for a timer. As another example, the configuration setting can be a power state (e.g., on, off) of an audio sensor, a vibration sensor, a light sensor, a motion sensor, a display, a position sensor, a proximity sensor, a speaker, a communication module, a power supply, an operational function, a ringer, a timer, a backlight, a user interface, a camera, an electronic compass, a barometer, a finger print reader, and the like.

As a specific example, the first configuration setting of the backlit remote control device 101 can comprise a low level sensitivity for a motion sensor (e.g., accelerometer, GPS device, etc.) and turning off the device backlight after 5 seconds. In this manner, the device features can be the motion sensor, the power supply for backlight, and timer associated with the power supply. The parameter associated with the device features are sensitivity (e.g., low level), power state for backlight (e.g., on), and timer associated with the power state (e.g. 5 seconds), respectively.

At step 204, a change in a device factor can be detected. As an example, the device factor can relate to one or more of: spatial position, light exposure, vibration, sound, sound pattern, activation state of one or more buttons, and the like. For example, a spatial position change of a device can be detected by a motion sensor, such as an accelerometer or a GPS device. As another example, the light exposure of a device can be detected by a light sensor, such as an ambient light sensor. As another example, the sound level and sound pattern can be detected by a sound sensor. As another example, a user can move the device from a dark environment to a bright environment or vice versa. As another example, a user can press a certain button or sequence of buttons on a device.

In an aspect, detecting a change in a device factor can comprise determining whether a threshold has been exceeded. For example, whether spatial position change has exceeded a threshold can be determined. As another example, whether the change of light exposure has exceeded a threshold can be determined. As another example, a user can move the device from a noisy to a quiet environment or vice versa. For example, when a user picks up or puts down a device, the spatial position change can exceed a threshold. Accordingly, a device factor change can be detected. As another example, when the backlit remote control device 101 remains stationary (e.g., no spatial change) for a predefined duration of time (e.g., 60 seconds), the time associated with a spatial position can exceed a threshold. Accordingly, a device factor change can be detected. As another example, when a user presses a number of buttons in a specific sequence (e.g., "play" and "pause") and no further action is detected for a predefined time (e.g., 60 seconds), a time threshold can be exceeded. Accordingly a device factor change can be detected.

At step 206, a second configuration setting for the feature in the device can be utilized in response to the detected change of step 204. In an aspect, the second configuration setting can be different from the first configuration setting. As an example, the second configuration setting can comprise one or more of: incrementing a value, decrementing a value, or changing the state of a parameter associated with a feature. For example, the second configuration setting can comprise incrementing or decrementing the value of sensitivity of an audio sensor, a vibration sensor, a light sensor, a motion sensor. As another example, the second configuration setting can comprise incrementing or decrementing the value of a speaker level, a power supply level, a ringer level. As another example, the second configuration setting can comprise incrementing or decrementing the brightness of a display or backlight. As another example, the second configuration setting can comprise incrementing or decrementing time for a timer. As another example, the second configuration setting can comprise changing the power state (e.g., on, off) of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like.

As another example, the second configuration setting of the backlit remote control device 101 can comprise a high level sensitivity for a motion and/or position sensor and turning on the device backlight. In this manner, the device's features can be the motion sensor and the power supply for backlight. The parameter associated with the device features are sensitivity (e.g., high level) and power state for backlight (e.g., on) respectively. The high level sensitivity can used to closely monitor the random spatial position change of the device when the device is being used.

Figure 3:
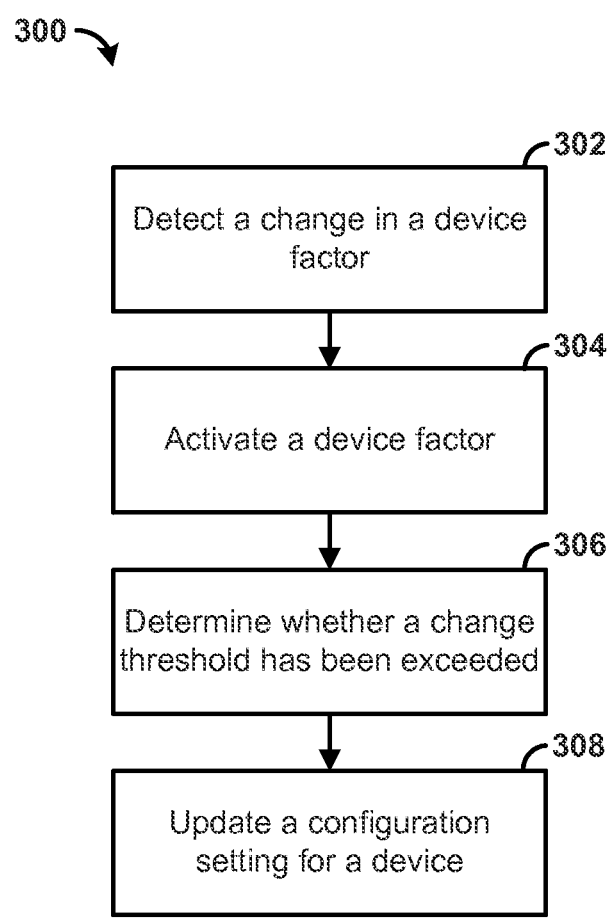
FIG. 3 is a flowchart illustrating another example method for utilizing adaptive settings for a device.

FIG. 3 is a flowchart illustrating another example method 300 for utilizing adaptive settings for a device. At step 302, a change in a device factor can be detected. As an example, the device factor can be or represent one or more of: a spatial position, light exposure, vibration, sound, sound pattern, buttons activation state, and the like. For example, a spatial position change of a device can be detected by a motion or position sensor, such as an accelerometer or global positioning system (GPS) device implemented in the device. As another example, the light exposure of a device can be detected by a light sensor, such as an ambient light sensor. As another example, the sound level and sound pattern can be detected by a sound sensor. In an aspect, detecting a change in a device factor can comprise determining whether a threshold of the configuration setting has been exceeded. For example, whether spatial position change has exceeded a predefined threshold can be determined. As another example, whether the change of light exposure has exceeded a predefined threshold can be determined. In an aspect, the device factor change can be activated by a user. For example, a user can pick up or put down a device. As another example, a user can press a certain button or certain sequence of buttons on a device. As another example, a user can move the device from a dark environment to a bright environment, from a noisy environment to a quiet environment, or vice versa.

At step 304, a device feature can be activated. For example, the sensitivity of an audio sensor, a vibration sensor, a light sensor, a motion sensor can be set to a predefined value or state. As another example, a speaker level, a power supply, or a ringer can be set to a predefined value. As another example, the brightness of a display or backlight can be set to a predefined value. As another example, a timer can be set for a predefined number. As another example, an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like can be set to a specific power state (e.g., on, off). In an aspect, more than one device features can be activated.

As an example, when the backlit remote control device 101 is utilizing the first configuration setting, a device factor change can be detected (e.g., device can be picked up by a user). In response to a device factor change (e.g., a device is picked up), more than one device feature can be activated; for example, to set the sensitivity of a motion sensor to high level and to keep the device backlight on.

At step 306, whether a change threshold has been exceeded can be determined. For example, whether a change threshold for spatial position has been exceeded can be determined. As another example, whether a change threshold for light exposure of a device has been exceeded can be determined. As another example, whether a change threshold for sound level has been exceeded can be determined. As another example, whether a change threshold for sound pattern has been exceeded can be determined. As an example, when a user picks up a device, the spatial position change of the device can exceed a threshold. When a user moves a device from a dark to a bright environment, the light exposure change of the device can exceed a threshold. When a user moves the device from a noisy to a quiet environment, the sound level change can exceed a threshold.

As an example, when the device is utilizing the second configuration setting (e.g., high sensitivity for a motion sensor, keep the device backlight on), if no spatial change is detected for a predefined duration of time (e.g., 60 seconds), a device feature is activated (e.g., set the sensitivity of the motion sensor to low level, turn off the device backlight after 5 seconds). In an aspect, it may be the case that a user is holding the device and intends to use it, but the sensitivity of a motion sensor is not adequate for detecting the movement of the device. As such, in response to the device backlight being turned off, the user can shake the device (e.g., high frequency spatial position change) soon after the device backlight is turned off, the device can be configured to utilize the second configuration setting (e.g., high sensitivity for the motion sensor, keep the device backlight on). In an aspect, a change threshold can be exceeded. Specifically, the elapsed time between turning off the device and the high frequency spatial position change of the device is below a predefined value (e.g., 2 seconds).

In an aspect, determining if a change threshold has been exceeded can comprise determining whether a frequency of a change threshold has been exceeded. As an example, if the user of the device performs another shake to turn on the device backlight immediately after the device backlight is turned off, not only the change threshold has been exceeded, but the frequency of the change threshold has been exceeded (e.g., a change threshold has been exceeded twice in 30 seconds).

Similarly, when the device is utilizing the second configuration setting (e.g., high sensitivity for a motion sensor, keep the device backlight on), if no spatial change is detected for a predefined time (e.g., 60 seconds), a device feature is activated (e.g., set the sensitivity of the motion sensor to low level, turn off the device backlight). If a user has never needed to shake the device after the device is turned off for a predefined times of use (e.g., 30, 60 times), a change threshold can be detected.

At step 308, a configuration setting for a device feature can be updated if a change threshold has been exceeded. In an aspect, updating a configuration setting for the device feature can comprise one or more of incrementing a value, decrementing a value, and changing the state of a value associated with a timer, a sensitivity, a power level, a brightness, and a power state, and the like.

As an example, in response to determining that the change threshold for the brightness in the environment has been exceeded, the brightness of the display or backlight in a device can be increased or decreased in a configuration setting for ease of viewing. For example, when the environment is bright enough, the backlight can be turned off.

As another example, in response to determining that the change threshold has been exceeded (e.g., the elapsed time between the turning off the device and the high frequency spatial position change of the device), a device feature (e.g., parameter associated with a device feature) in the first configuration setting (e.g. backlight timer) can be updated to temporarily or permanently increment X seconds (e.g., 1 second, 2 seconds) to the original backlight timer setting (e.g., 5 seconds) or previous timer setting. As another example, the sensitivity of the motion sensor in the device can be increased to a higher level than the sensitivity in the original second configuration setting.

As an example, in response to determining that the change threshold has been exceeded (e.g., a user has never needed to shake the device after the device is turned off for a predefined times of use), a device feature (e.g., backlight timer) in the first configuration setting can be temporarily or permanently updated to decrement X seconds (e.g., 1 second, 2 seconds) from the previous or original timer setting.

Figure 4:
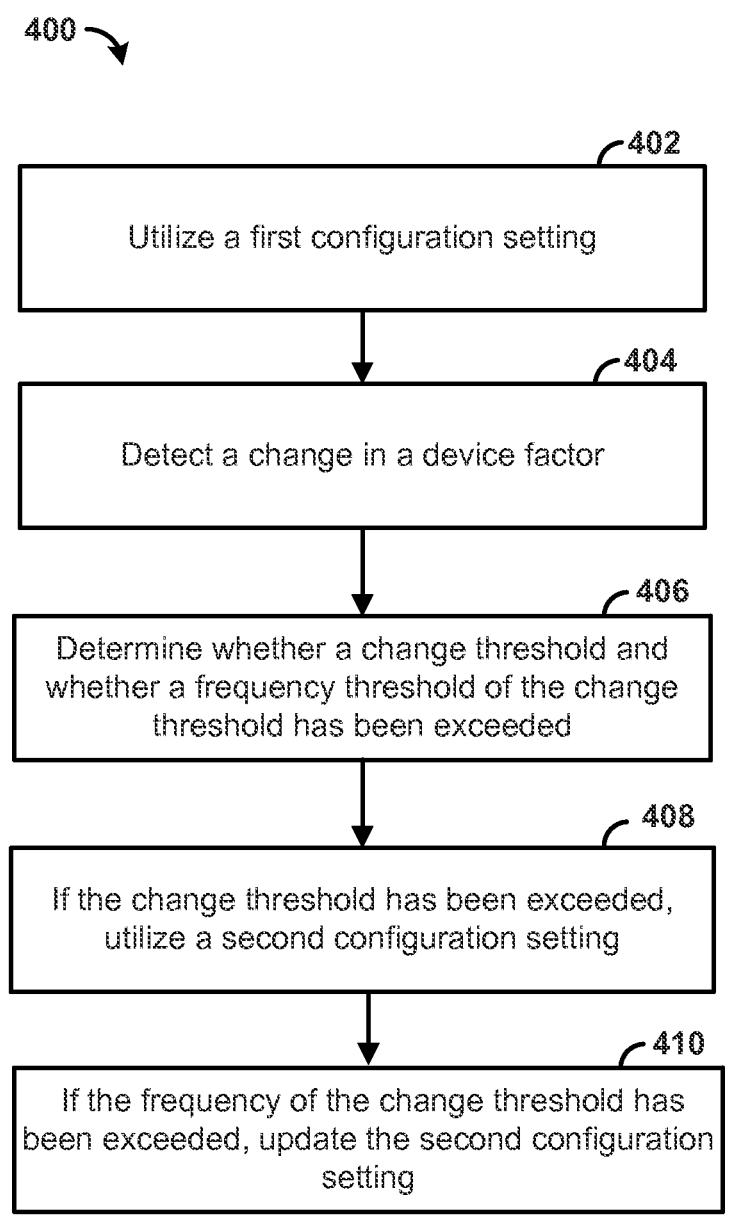
FIG. 4 is a flowchart illustrating another example method for utilizing adaptive settings for a device.

FIG. 4 is a flowchart illustrating another example method 400 for utilizing adaptive settings for a device. At step 402, a first configuration setting for a feature in a device can be utilized. As an example, the feature in a device can be, or be implemented using one or more of an audio sensor, a vibration sensor, a light sensor, a motion sensor, a position sensor, a proximity sensor, a display, a speaker, a communication module, a power supply, an operational function, a ringer, a timer, a backlight, a user interface, a camera, an electronic compass, a barometer, a finger print reader, and the like. In an aspect, the configuration setting can be a parameter associated with the feature. For example, the parameter can relate to one or more of a timer value, a sensitivity, a power level, a brightness, a power state, and the like. In an aspect, the parameter associated with the device feature can be set to a specific value. As an example, the configuration setting can be a predefined value of sensitivity of an audio sensor, a vibration sensor, a light sensor, a motion sensor, a position sensor. As another example, the configuration setting can be a predefined value of a speaker level, a power supply level, a ringer level. As another example, the configuration setting can be a predefined brightness of a display or backlight. As another example, the configuration setting can be a predefined time for a timer. As another example, the configuration setting can be a power state (e.g., on, off) of an audio sensor, a vibration sensor, a light sensor, a motion sensor, a display, a position sensor, a proximity sensor, a speaker, a communication module, a power supply, an operational function, a ringer, a timer, a backlight, a user interface, a camera, an electronic compass, a barometer, a finger print reader, and the like.

As a specific example, the first configuration setting of the backlit remote control device 101 can comprise a low level sensitivity for a motion sensor (e.g., accelerometer, GPS device, etc.) and turning off the device backlight after 5 seconds. In this manner, the device features can be the motion sensor, the power supply for backlight, and timer associated with the power supply. The parameter associated with the device features are sensitivity (e.g., low level), power state for backlight (e.g., on), and timer associated with the power state (e.g. 5 seconds), respectively.

At step 404, a change in a device factor can be detected. As an example, the device factor can relate to one or more of: spatial position, light exposure, vibration, sound, sound pattern, activation state of one or more buttons, and the like. For example, a spatial position change of a device can be detected by a motion sensor, such as an accelerometer or a GPS device. As another example, the light exposure of a device can be detected by a light sensor, such as an ambient light sensor. As another example, the sound level and sound pattern can be detected by a sound sensor. As another example, a user can move the device from a dark environment to a bright environment or vice versa. As another example, a user can press a certain button or sequence of buttons on a device.

At step 406, whether a change threshold associated with the device factor has been exceeded and whether a frequency threshold of the change threshold has been exceeded can be determined. As an example, determining whether the change threshold has been exceeded can comprise determining whether spatial position change has exceeded a threshold, whether the change of light exposure has exceeded a threshold, whether the spatial position change has exceeded a threshold. In an aspect, whether a frequency threshold of the change threshold has been exceeded can be determined. For example, if the change of threshold has been exceeded for more than a predefined number of times (e.g., two times) over a predefined time (e.g., 30 seconds), the frequency threshold has been exceeded.

At step 408, if the change threshold has been exceeded, a second configuration setting can be utilized. For example, it may be the case that a user is holding a device and intends to use it, but the sensitivity of a motion sensor is not adequate for detecting the movement of the device. In this scenario, in response to the device backlight being turned off, the user can shake the device (e.g., spatial position change exceeds a threshold) soon after the device backlight is turned off, the device can be configured to utilize a second configuration setting (e.g., high sensitivity for the motion sensor, turning off the device backlight after 10 seconds).

At step 410, if the frequency threshold of the change of the threshold has been exceeded, the second configuration setting can be updated. For example, it may be the case that a user is holding a device and intends to use it, but the sensitivity of a motion sensor in the second configuration setting is still not adequate for detecting the movement of the device. As an example, if the user of the device performs another shakes to turn on the device backlight immediately after the device backlight is turned off, the frequency threshold of the change threshold has been exceeded (e.g., a change threshold has been exceeded twice in 30 seconds), the second configuration setting can be updated. For example, the sensitivity level of the second configuration setting can be further increased. As another example, the timer to keep the device backlight on can be updated from 10 seconds to 15 seconds for the second configuration setting.

Figure 5:
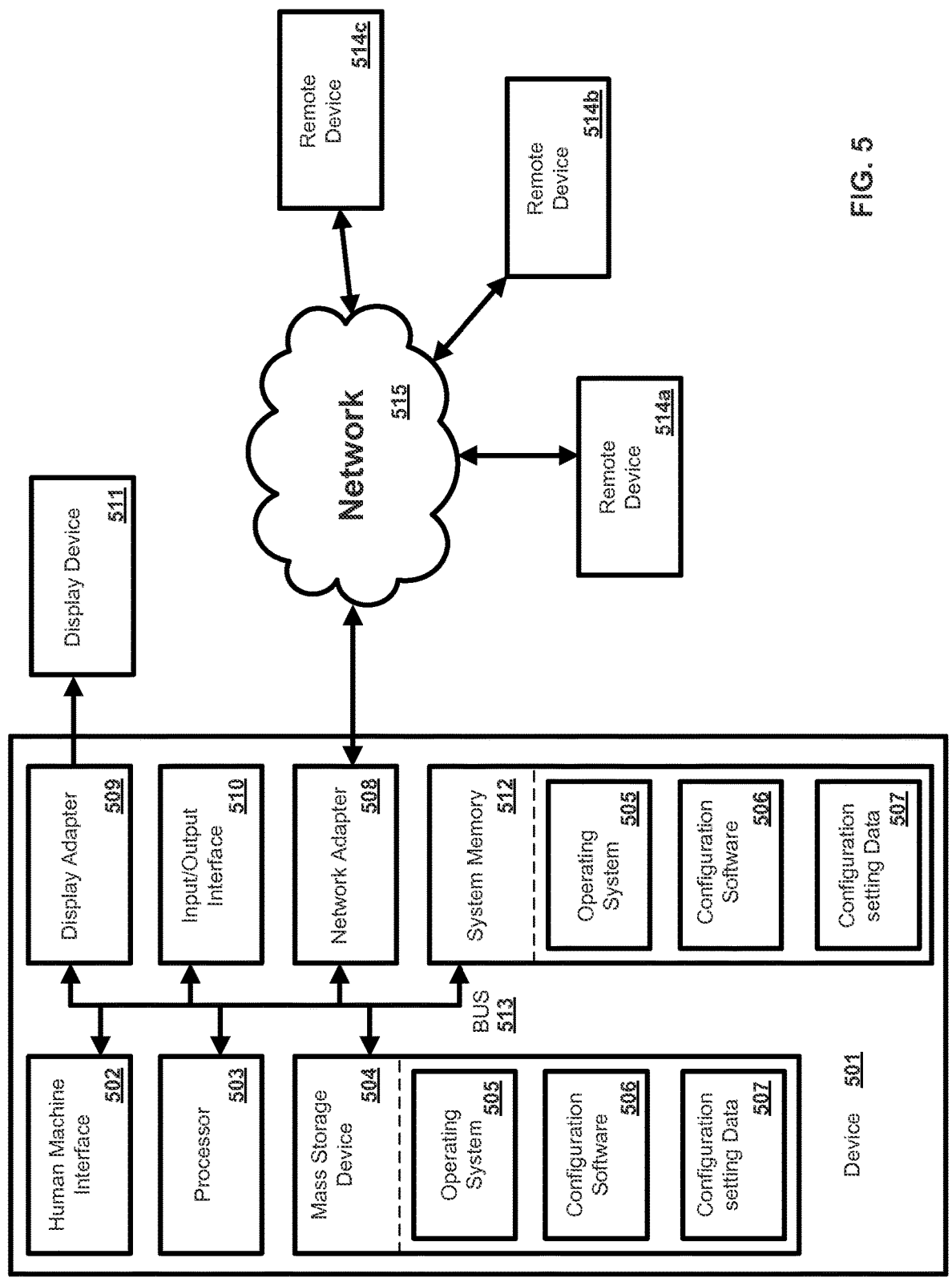
FIG. 5 is a block diagram illustrating an example computing device in which the present systems and methods can operate.

FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

In an exemplary aspect, the methods and systems can be implemented on a device 501 and remote devices 514a,b,c as illustrated in FIG. 5 and described below. The methods and systems disclosed can utilize one or more computers to perform one or more functions in one or more locations. In an aspect, the configuration settings and/or user profiles of the device 501 can be stored in remote storage devices or systems, such as remote devices 514a,b,c. In another aspect, the configuration settings and/or user profiles of the device 501 can be updated and/or retrieved via one or more remote devices, such as remote devices 514a,b,c. For example, the configuration settings and/or user profiles for the device 501 can be updated or retrieved by entering a device identifier of the device 501 via the remote devices 514a,b,c. In an aspect, the device identifier of the device 501 can be associated with a list of device features and base parameters associated with of the device features of the device 501. As another example, the configuration settings and/or user profiles of the device 501 can be updated and/or retrieved by entering a user identifier via the device 501 or remote devices 514a,b,c. The user identifier can be associated with preferred configuration settings for a specific user of a specific device (e.g., device 501).

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by processing devices that are linked through a communications network. In a distributed computing environment, program modules can be located in both local and computer storage media including memory storage devices.

Further, one skilled in the art will appreciate that the systems and methods disclosed herein can be implemented via a general-purpose device in the form of a device 501. The components of the device 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, configuration software 506, configuration setting data 507, a network adapter 508, system memory 512, an Input/Output Interface 510, a display adapter 509, a display device 511, and a human machine interface 502, can be contained within one or more remote devices 514a,b,c at physically separate locations, connected through buses of this form, in effect implementing a fully distributed system.

The device 501 typically comprises a variety of computer readable media. Exemplary readable media can be any available media that is accessible by the device 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data, such as configuration setting data 507, and/or program modules, such as operating system 505 and configuration software 506, that are immediately accessible to and/or are presently operated on by the processing unit 503. As an example, the system memory 512 can be configured for storing configuration settings applicable for the device 501.

As an example, the processor or the processing unit 503 can be configured for performing steps comprising utilizing the first configuration setting for a feature in a device, detecting a change in a device factor and utilizing the second configuration setting for the feature in the device in response to the detected change. In another aspect, the processor or the processing unit 503 can detect a change in a device factor, activate a device feature, determine whether a change threshold has been exceeded, and update a configuration setting for a device feature if the change threshold has been exceeded.

In another aspect, the device 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the device 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and configuration software 506. Each of the operating system 505 and configuration software 506 (or some combination thereof) can comprise elements of the programming and the configuration software 506. Configuration setting data 507 can also be stored on the mass storage device 504. Configuration setting data 507 can be stored in any of one or more databases known in the art. Examples of such databases comprise. DB2®, Microsoft® Access, Microsoft® SQL Server, Oracle®, mySQL, PostgreSQL, and the like. The databases can be centralized or distributed across multiple systems.

In another aspect, the user can enter commands and information into the device 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the device 501 can have more than one display adapter 509 and the device 501 can have more than one display device 511. For example, a display device can be a monitor, an LCD (Liquid Crystal Display), or a projector. In addition to the display device 511, other output peripheral devices can comprise components, such as speakers (not shown) and a printer (not shown) which can be connected to the device 501 via Input/Output Interface 510. Any step and/or result of the methods can be output in any form to an output device. Such output can be any form of visual representation, including, but not limited to, textual, graphical, animation, audio, tactile, and the like. The display 511 and device 501 can be part of one device, or separate devices.

The device 501 can operate in a networked environment using logical connections to one or more remote devices 514a,b,c. By way of example, a remote device can be a personal computer, portable computer, smartphone, a server, a router, a network computer, a peer device or other common network node, and so on. Logical connections between the device 501 and a remote device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 505, are illustrated herein as discrete blocks, although it is recognized that such programs and components reside at various times in different storage components of the device 501, and are executed by the data processor(s) of the computer. An implementation of configuration software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM. EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    causing, by a device, a sensor to use a first sensitivity level;
    causing, based on a detection by the sensor using the first sensitivity level of a change of a plurality of changes in a device factor, a feature to be activated and the sensor to use a second sensitivity level;
    determining, based on a detection by the sensor using the second sensitivity level of the plurality of changes, that a frequency of the plurality of changes in the device factor satisfies a frequency threshold; and
    causing, based on the frequency of the plurality of changes in the device factor satisfying the frequency threshold, a timeout period associated with the feature to be extended, wherein the feature is deactivated upon an expiration of the timeout period.

2. The method of claim 1, wherein the first sensitivity level of the sensor comprises a low sensitivity level for a motion sensor of the device, and wherein the second sensitivity level of the sensor comprises a high sensitivity level for the motion sensor of the device.

3. The method of claim 1, wherein the feature comprises at least one of a device light, a device speaker, or a device display.

4. The method of claim 1, wherein the feature is associated with a parameter, wherein the parameter is associated with a power state.

5. The method of claim 1, wherein the sensor comprises at least one of a motion sensor or a light sensor.

6. The method of claim 1, wherein the device factor comprises at least one of: a spatial position, light exposure, or an activation state of at least one button.

7. The method of claim 1, further comprising detecting another change of the plurality of changes in the device factor, wherein detecting the another change comprises determining whether a change threshold has been satisfied.

8. The method of claim 1, wherein the second sensitivity level of the sensor is different from the first sensitivity level of the sensor.

9. The method of claim 8, wherein the second sensitivity level of the sensor comprises at least one of: increasing a value, decreasing the value, or changing a state of a value of the first sensitivity level of the sensor.

10. The method of claim 1, further comprising:
    detecting a third change of the plurality of changes in the device factor; and
    utilizing a third sensitivity level of the sensor for the feature in the device based on the third change.

11. A method comprising:
    causing, based on a detection by a sensor using a first sensitivity level of at least one change of a plurality of changes in a device factor, a device feature of a device to be activated and the sensor to use a second sensitivity level;
    determining, based on a detection by the sensor using the second sensitivity level of the plurality of changes, that a frequency of the plurality of changes in the device factor satisfies a frequency threshold; and
    causing, based on the frequency of the plurality of changes in the device factor satisfying the frequency threshold, a first timeout period associated with the device feature to be changed to a second timeout period, wherein the device feature is deactivated upon an expiration of the second timeout period.

12. The method of claim 11, wherein the device feature is associated with a parameter.

13. The method of claim 12, wherein the parameter is associated with a power state.

14. The method of claim 11, wherein the sensor comprises at least one of a motion sensor or a light sensor.

15. The method of claim 11, wherein the device factor comprises at least one of: spatial position, light exposure, a vibration, a sound, or a sound pattern.

16. The method of claim 11, wherein the second sensitivity level of the sensor is different from the first sensitivity level of the sensor.

17. The method of claim 16, wherein the second sensitivity level of the sensor comprises at least one of: increasing a value, decreasing the value, or changing a state of a value of the first sensitivity level of the sensor.

18. The method of claim 11, further comprising:
detecting another change of the plurality of changes in the device factor; and
utilizing the first sensitivity level of the sensor based on the another change of the plurality of changes.

19. The method of claim 18, further comprising:
detecting a third change of the plurality of changes in the device factor; and
utilizing a third sensitivity level of the sensor based on the third change.

20. The method of claim 11, further comprising detecting another change of the plurality of changes in the device factor, wherein detecting the another change comprises determining whether a change threshold has been satisfied.

21. An apparatus comprising:
one or more processors; and
a memory storing processor-executable instructions that, when executed by the one or more processors cause the apparatus to:
cause a sensor to use a first sensitivity level;
cause, based on a detection by the sensor using the first sensitivity level of a change of a plurality of changes in a device factor, a feature to be activated and the sensor to use a second sensitivity level;
determine, based on a detection by the sensor using the second sensitivity level of the plurality of changes, that a frequency of the plurality of changes in the device factor satisfies a frequency threshold; and
cause, based on the frequency of the plurality of changes in the device factor satisfying the frequency threshold, a timeout period associated with the device factor to be extended, wherein the feature is deactivated upon an expiration of the timeout period.

22. The apparatus of claim 21, wherein the device factor comprises at least one of: a spatial position, light exposure, a vibration, a sound, or a sound pattern.

23. The apparatus of claim 21, wherein the feature is associated with a parameter, wherein the parameter is associated with a power state.

24. The apparatus of claim 21, wherein the feature comprises at least one of a device light, a device speaker, or a device display.

25. The apparatus of claim 21, wherein the sensor comprises at least one of a motion sensor or a light sensor.

26. The apparatus of claim 21, wherein the first sensitivity level of the sensor comprises a low sensitivity level for a motion sensor of the apparatus, and wherein the second sensitivity level of the sensor comprises a high sensitivity level for the motion sensor of the apparatus.

* * * * *